United States Patent
Ackermann et al.

[11] Patent Number: 5,912,515
[45] Date of Patent: Jun. 15, 1999

[54] MOTOR WITH MOTOR PARTS WHICH ARE MOVABLE RELATIVE TO ONE ANOTHER

[75] Inventors: Bernd Ackermann; Leo Honds, both of Aachen, Germany; Johan C. Compter, Eindhoven, Netherlands; Pingh-Shih Wang, Cheshire, Conn.

[73] Assignee: U.S. Philips Corporation, New York, N.Y.

[21] Appl. No.: 08/809,438

[22] PCT Filed: Aug. 21, 1996

[86] PCT No.: PCT/IB96/00822

§ 371 Date: Jul. 21, 1997

§ 102(e) Date: Jul. 21, 1997

[87] PCT Pub. No.: WO97/08809

PCT Pub. Date: Mar. 6, 1997

[30] Foreign Application Priority Data

Aug. 23, 1995 [DE] Germany ................................ 19530918

[51] Int. Cl.⁶ ...................................................... H02K 7/00
[52] U.S. Cl. ...................... 310/67 R; 310/156; 310/157; 310/187; 310/51; 310/269
[58] Field of Search .................... 310/157, 67 R, 310/187, 269

[56] References Cited

U.S. PATENT DOCUMENTS

| | | | |
|---|---|---|---|
| 564,703 | 7/1896 | Lamme | 310/269 |
| 4,280,072 | 7/1981 | Gotou et al. | 310/67 |
| 4,874,975 | 10/1989 | Hertich | 310/186 |
| 4,900,963 | 2/1990 | Amano et al. | 310/187 |
| 4,998,032 | 3/1991 | Burgbacher | 310/51 |
| 5,382,853 | 1/1995 | Von Der Heide et al. | 310/67 R |

FOREIGN PATENT DOCUMENTS

| | | | |
|---|---|---|---|
| 0709947A2 | 5/1996 | European Pat. Off. | H02K 21/22 |
| 2823208C2 | 1/1979 | Germany | H02K 21/22 |

*Primary Examiner*—Nestor Ramirez
*Assistant Examiner*—Thanh Lam
*Attorney, Agent, or Firm*—Edward Blocker; Bernard Franzblau

[57] ABSTRACT

A motor with reduced radial forces includes a first motor part made up of 2P permanent magnet poles surrounding a second motor part formed by a magnetic yoke having a number T of pole teeth and with an air gap between the first and second motor parts. The first and second motor parts are moveable relative to one another. Exciter coils are mounted on the pole teeth and the pole teeth are separated by pole gaps. For a motor with a number 2P magnet poles and a number T of pole teeth which do not have a common submultiple greater than 1, each of the pole teeth have a centrally located auxiliary slot facing the air gap thereby to reduce undesirable radial forces.

17 Claims, 1 Drawing Sheet

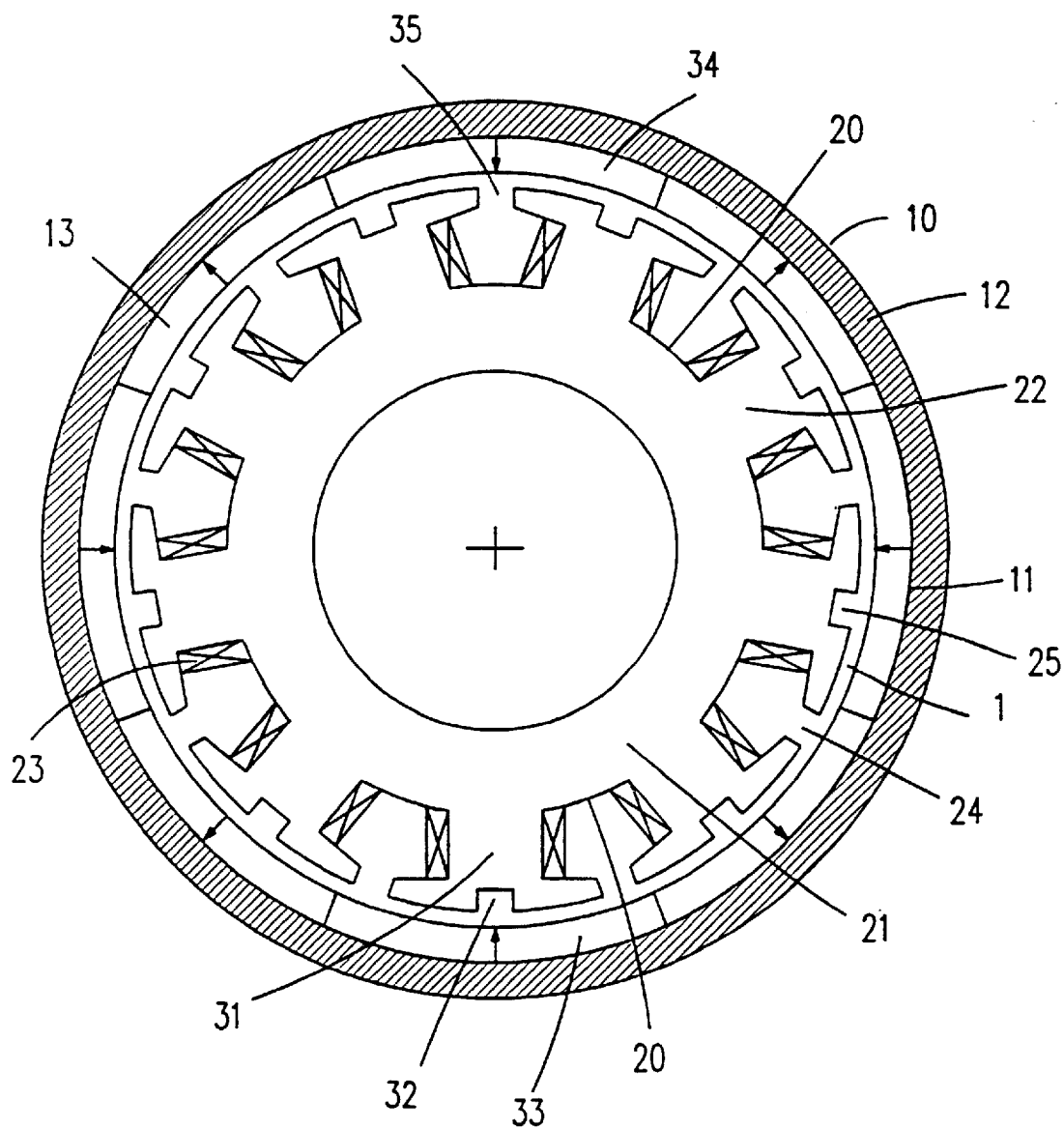

MOTOR WITH MOTOR PARTS WHICH ARE MOVABLE RELATIVE TO ONE ANOTHER

BACKGROUND OF THE INVENTION

This invention relates to a motor having motor parts which are movable relative to one another, of which the first motor part forms a multi-pole excitation field in an air gap by means of a permanent magnet with 2p magnet poles and of which the second motor part is a yoke having a number T of pole teeth which project towards the air gap and which carry exciter coils and are spaced by pole gaps.

Such motors are known as rotary motors, for example, from DE 28 23 208 C2 and from DE 31 22 049 C2. In such motors a detent torque is produced as a result of the interaction between the magnetized poles of the permanent magnet and the pole teeth of the yoke. This detent torque is usually undesirable because it may give rise to unwanted oscillations. The order of the fundamental frequency of the torque follows from the least common multiple of the number of magnet poles 2p and the number of teeth T and should be as large as possible because the amplitude of this undesirable torque decreases as the order increases. Accordingly, there are motors having large detent torques and motors having small detent torques on account of the number of magnet poles 2p of the permanent magnet and the number of pole teeth T. A motor having a pole-pair number 2p=2 and a tooth number T=3 will have a detent torque with a fundamental frequency of the order 6. The amplitude of the detent torque is consequently comparatively high. DE 28 23 208 C2 describes how such detent torques can be reduced by indentations in the pole teeth.

However, there are also motors which on account of their magnet pole number 2p and tooth number T already have a small detent torque without such additional measures. For example, the detent torque of a motor having a magnet pole number 2p=8 and a tooth number T=9 has a fundamental frequency of the order 72. Therefore, the amplitude of the detent torque of such a motor is very low. However, a problem associated with such a motor is that it is not symmetrical, i.e. the magnetic field in the air gap is not symmetrical. As a result, radial forces are exerted on the rotating motor part of the motor. For example, if a magnet pole of such a motor directly faces a pole tooth across the air gap, the magnet pole which is 180° shifted in the circumferential direction faces a pole gap, as a result of which the radial forces between the two motor parts no longer cancel one another.

SUMMARY OF THE INVENTION

It is an object of the invention to construct a motor of the type defined in the opening paragraph so as to reduce or eliminate radial forces produced as a result of asymmetrical magnet fields in the air gap.

According to the invention this object is achieved in that, in the case of motors in which the number 2p of magnet poles and the number T of pole teeth do not have a common submultiple greater than 1, the pole teeth each have an auxiliary slot in their centers at the side facing the air gap.

Radial forces always occur if the magnetic field in the air gap has no symmetry. The magnetic field in the air gap is asymmetrical if, viewed in the circumferential direction, the magnetic field recurs periodically only after 360°. This is the case if the number of magnet poles and the number of pole teeth do not have a common submultiple greater than 1 because the periodicity is exactly 360° divided by the greatest common divisor.

Practical examples of motors of this type include motors having three pole teeth and two magnet poles, three pole teeth and four magnet poles and nine pole teeth and eight magnet poles.

Since the number of magnet poles 2p is always even radial forces can occur only in the case of an odd number T of pole teeth in the above arrangements. If each tooth is provided with an auxiliary slot in its center at the side facing the air gap, this will cause the number of openings of the yoke directed towards the air gap to be doubled, i.e. T pole gaps and T auxiliary slots. This results in symmetrization of the magnetic field in the air gap. If a magnet pole faces a pole gap, the magnet pole which is 180° shifted in the circumferential direction faces an auxiliary slot, thereby reducing the radial forces between the two motor parts.

An advantageous embodiment of the invention is characterized in that the auxiliary slots have been formed in such a manner that each of them has the same magnetic effect as the pole gaps between the pole teeth.

If each pole tooth is provided with an auxiliary slot, whose effect as regards the formation of the magnetic field corresponds to that of a pole gap, complete symmetry of the magnetic field in the air gap is achieved and the radial forces are eliminated completely.

The compensation effect of the auxiliary slots also can be also explained on the basis of the following considerations. If each pole tooth is provided with an auxiliary slot, whose effect as regards the formation of the magnetic field corresponds to that of a pole gap, this doubles the effective number of teeth. Since, as a result of this, the effective number of teeth has become even, the number of teeth and the number of magnet poles now have a common divisor and the radial forces are eliminated.

As already stated hereinbefore, the order of the fundamental wave of the detent torque is equal to the least common multiple of the number of teeth and the number of magnet poles. The measure described above has no influence on this because in the case of an even number of magnet poles the multiplication of the odd number of teeth by a factor of 2, as a result of which the effective number of teeth is doubled, does not affect the least common multiple.

BRIEF DESCRIPTION OF THE DRAWINGS

The invention will now be described in more detail with reference to the single FIGURE of the drawing which shows a sectional view of a motor according to the invention.

DESCRIPTION OF THE PREFERRED EMBODIMENTS

The single FIGURE of the drawing is a diagrammatical sectional view showing a motor with motor parts which are movable relative to one another. The motor comprises a first motor part 10 with a multi-pole permanent magnet 11 mounted in a soft-iron yoke 12, which surrounds this permanent magnet. The permanent magnet 11 has eight magnet poles 13, which are equi-spaced along the circumference and whose polarity alternates in the circumferential direction. The first motor part 10 and a second motor part 20 are supported so as to be rotatable relative to one another. An air gap 1 exists between the first motor part 10 and the second motor part 20. The second motor part 20 comprises a soft-iron yoke 21 having nine pole teeth 22, which project towards the air gap 1 and which carry exciter coils 23. Viewed in the circumferential direction nine pole gaps 24 are present between the nine pole teeth 22 of the second motor part 20. In their centers the teeth 22 of the second motor part 20 each have an auxiliary slot 25 at the side facing the air gap 1, which slots have approximately the same size as the pole gaps 24.

The order of the fundamental frequency of the detent torque of the motor in the embodiment described here is equal to the least common multiple of the number of teeth T=9 and the number of magnet poles 2p=8, i.e. 72. Therefore, the amplitude of the detent torque, which decreases as the order increases, is very small so that this motor is preferably utilized for a variety of uses. As this motor has an odd number of teeth T=9, an asymmetrical magnetic field is obtained in the air gap if no additional measures are taken, as a result of which radial forces occur between the first motor part 10 and the second motor part 20. The auxiliary slots 25 ensure that the air-gap field becomes symmetrical and thereby preclude the occurrence of radial forces.

In order to clarify the function of these auxiliary slots 25, the pole tooth 31 with the auxiliary slot 32, the magnet pole 33 as well as the pole gap 35 and the magnet pole 34 at the opposite side will now be considered more closely. These elements are exactly similar to the other magnet poles 13, pole gaps 24, pole teeth 22 and auxiliary slots 25 and have only been given other reference numerals in order to explain the role of the auxiliary slots 25. In the position of the motor parts 10 and 20 shown in the single FIGURE of the drawing the pole tooth 31 with the auxiliary slot 32 is centered, viewed in the circumferential direction, relative to the magnet pole 33 of the permanent magnet 11. The magnet pole 34, which is 180° shifted relative to the magnet pole 33 in the circumferential direction, is centered relative to the pole gap 35. Since the pole gap 35 and the auxiliary slot 32 are substantially equal in size they also have the same magnetic influence on the formation of the magnetic field in the air gap 1. The magnetic resistance of the second motor part 20 relative to the magnet pole 34 of the first motor part 10 is equal to the magnetic resistance of the second motor part 20 relative to the magnet pole 33 of the first motor part 10. As a result of this, the radial forces between the motor parts 10 and 20 in the direction of the magnet poles 20 33 and 34 cancel one another. Similar considerations apply to the other magnet poles 13 of the permanent magnet 11. Hence, it follows that no radial forces occur between the motor parts 10 and 20 as a result of the magnetic interaction between these parts.

The embodiment of the motor with a pole pair number 2p=8 and a tooth number T=9 is an example of a motor having an asymmetrical magnetic field in its air gap without auxiliary slots 25. The symmetrization of the air-gap field and hence the elimination of radial forces by means of the auxiliary slots 25 is possible for all motors with asymmetrical air-gap fields. Crucial for the symmetrizing effect of the auxiliary slots 25 is that these slots are disposed in the centers of the pole teeth 22. These auxiliary slots 25 situated in the centers of the pole teeth 22 do not change the order of the fundamental frequency of the detent torque.

We claim:

1. A motor comprising: first and second motor parts which are movable relative to one another, wherein the first motor part forms a multi-pole excitation field in an air gap by means of permanent magnet means with 2p magnet poles, and the second motor part is a yoke having a number T of pole teeth which project towards the air gap and which carry exciter coils and are spaced by pole gaps, wherein the number 2p of magnet poles and the number T of pole teeth do not have a common submultiple greater than 1, and the pole teeth each have an auxiliary slot in their centers at a side thereof facing the air gap thereby to substantially reduce radial magnetic forces in the motor.

2. A motor as claimed in claim 1, wherein the auxiliary slots have been formed in a manner such that each of the auxillary slots has the same magnetic effect as the pole gaps between the pole teeth.

3. A motor as claimed in claim 2, wherein the auxiliary slots are similar in shape to the pole gaps.

4. A motor as claimed in claim 1, wherein the auxiliary slots have a similar shape to that of the pole gaps.

5. A motor as claimed in claim 1, wherein the number 2P of magnet poles is an even number and the number T of pole teeth is an odd number.

6. A motor as claimed in claim 1, wherein each auxiliary slot is positioned 180° about the yoke from a corresponding pole gap situated between a pair respective adjacent pole teeth.

7. A motor as claimed in claim 1, wherein the first motor part comprises an annular yoke of magnetic material supporting said permanent means magnet which includes a plurality of arcuate permanent magnet segments alternately radially magnetized with opposite polarity, and the yoke of the second motor part is an annular member made of a magnetic material.

8. A motor as claimed in claim 1, wherein the number 2P of magnet poles is 8 and the number T of pole teeth is 9 such that an asymmetrical magnetic field would be produced in the air gap absent said auxiliary slots in the pole teeth.

9. The motor as claimed in claim 1 wherein the permanent magnet means comprise a plurality of circumferentially disposed permanent magnet segments contiguous to one another so as to form a continuous surface facing the air gap.

10. A motor comprising:
first and second annular motor parts moveably mounted relative to one another and with an air gap therebetween,
wherein the first motor part comprises permanent magnet means having 2P magnet poles which produce a multi-pole magnetic excitation field in the air gap, and
wherein the second motor part comprises a magnetic yoke having a number T of pole teeth which project towards the air gap and which carry exciter coils and which are spaced by pole gaps,
wherein the motor comprises a number 2P of magnet poles and a number T of pole teeth which do not have a common submultiple greater than 1, and the pole teeth each have an auxiliary slot in the center thereof at a side facing the air gap and dimensioned so as to significantly reduce radial motor forces.

11. The motor as claimed in claim 10, wherein the auxiliary slots are substantially equal in size to the pole gaps such that the auxiliary slots have approximately the same magnetic influence as the pole gaps on the formation of a magnetic field in the air gap.

12. The motor as claimed in claim 10, wherein the number 2P of magnet poles is an even number and the number T of pole teeth is an odd number.

13. The motor as claimed in claim 10, wherein each auxiliary slot is diametrically opposed to a respective pole gap between an adjacent pair of pole teeth approximately diametrically opposed to the respective pole tooth containing said auxiliary slot.

14. The motor as claimed in claim 10 wherein the permanent magnet means comprise a plurality of circumferentially disposed permanent magnet segments contiguous to one another so as to form a closed permanent magnet ring.

15. The motor as claimed in claim 10 wherein each pole tooth has only one centrally located auxiliary slot dimensioned so as to produce a symmetrical magnetic field in the air gap that substantially reduces radial magnetic forces in the motor.

16. The motor as claimed in claim 10 wherein the number 2P of magnet poles is 8 and the number T of pole teeth is 9.

17. A direct current motor in which the radial reluctance is balanced, comprising:

a cylindrical permanent magnet rotor having a plurality of rotor poles defined by radially magnetized, alternately poled, circumferential sectors defining a cylindrical surface;

a salient pole stator having a different plurality of radially disposed salient poles defining stator slots therebetween;

a pole tip mounted to each salient pole;

a pole face on each pole tip radially spaced from said cylindrical surface and defining a radial gap therewith, each pole face having a pole face slot therein extending axially of said pole face and magnetically characterizing said stator slot, the number representing the sum of said stator slots and pole face slots and the number representing said plurality of rotor poles each being divisible by the same integer.

\* \* \* \* \*